(12) United States Patent
Feit

(10) Patent No.: US 10,744,838 B2
(45) Date of Patent: Aug. 18, 2020

(54) PET MODE DOOR AND SUSPENSION CONTROL SYSTEM AND METHOD

(71) Applicant: Honda Motor Co., Ltd., Tokyo (JP)

(72) Inventor: Steven Feit, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 15/792,219

(22) Filed: Oct. 24, 2017

(65) Prior Publication Data
US 2019/0118603 A1    Apr. 25, 2019

(51) Int. Cl.
| | | |
|---|---|---|
| *B60G 17/017* | (2006.01) | |
| *B60G 17/056* | (2006.01) | |
| *B60G 99/00* | (2010.01) | |
| *B60G 17/027* | (2006.01) | |
| *B60G 11/27* | (2006.01) | |
| *E05F 15/70* | (2015.01) | |

(52) U.S. Cl.
CPC ............ *B60G 17/017* (2013.01); *B60G 11/27* (2013.01); *B60G 17/027* (2013.01); *B60G 17/0565* (2013.01); *B60G 99/002* (2013.01); *B60G 2202/412* (2013.01); *B60G 2202/413* (2013.01); *B60G 2400/952* (2013.01); *B60G 2500/324* (2013.01); *B60G 2500/326* (2013.01); *B60G 2600/20* (2013.01); *B60G 2600/202* (2013.01); *B60G 2800/202* (2013.01); *E05F 15/70* (2015.01); *E05Y 2900/50* (2013.01)

(58) Field of Classification Search
CPC ............... B60G 17/017; B60G 17/027; B60G 17/0565; B60G 99/002; E05F 15/70; E05Y 2900/50
See application file for complete search history.

(56) References Cited

U.S. PATENT DOCUMENTS

| | | | |
|---|---|---|---|
| 2,706,009 A | 4/1955 | Schramm | |
| 2,940,768 A * | 6/1960 | Thompson | B62D 61/12 280/2 |
| 3,633,775 A | 1/1972 | Pugliese | |

(Continued)

FOREIGN PATENT DOCUMENTS

| | | |
|---|---|---|
| DE | 102008006848 | 1/2008 |
| DE | 102014215293 | 8/2014 |
| WO | 2000074971 | 12/2000 |

OTHER PUBLICATIONS

Volvo XC90 owner's manual; http://support.volvocars.com/uk/cars/Pages/owners-manual.aspx?mc=v526&my=2016&sw=15w46&article=71cdd2c289776035c0a801510695a460 (Accessed Aug. 14, 2017).
Bruzek. "What Does This Button Do?"; Cars.com; https://www.cars.com/articles/2014/02/what-does-this-button-do/(Accessed Aug. 14, 2017).

*Primary Examiner* — Darlene P Condra
(74) *Attorney, Agent, or Firm* — Rankin, Hill & Clark LLP

(57) ABSTRACT

A pet mode door and suspension control system and method includes determining whether a door control action has occurred with respect to a door on the vehicle. When determined that the door control action has occurred, the system and method further includes determining whether a pet mode control action is needed. When determined that the pet mode control action is needed, a suspension control command is sent to suspension control system for raising and/or lowering at least one side of the vehicle and a door control command is sent to a power control unit for opening or closing the door in accord with the door control action.

20 Claims, 6 Drawing Sheets

(56) References Cited

U.S. PATENT DOCUMENTS

| | | | |
|---|---|---|---|
| 4,260,315 A | | 4/1981 | Bouffard |
| 5,517,847 A | * | 5/1996 | Campbell ............ B60G 17/016 |
| | | | 280/5.514 |
| 5,765,859 A | | 6/1998 | Nowell et al. |
| 5,887,880 A | | 3/1999 | Mullican et al. |
| 6,098,995 A | | 8/2000 | Danis |
| 7,501,936 B2 | * | 3/2009 | Zagler .................. E05F 15/695 |
| | | | 340/3.1 |
| 7,651,153 B2 | | 1/2010 | Martin et al. |
| 8,228,166 B2 | * | 7/2012 | Eberhard ............ B60R 25/2036 |
| | | | 340/5.61 |
| 8,413,997 B1 | * | 4/2013 | Coombs ............... B60G 17/052 |
| | | | 280/6.151 |
| 8,662,334 B2 | | 3/2014 | Turvey et al. |
| 9,266,403 B2 | * | 2/2016 | Suzuki ................. B60G 17/017 |
| 9,352,678 B1 | | 5/2016 | Weldy |
| 9,358,854 B1 | * | 6/2016 | Sandbulte ............ B60G 17/017 |
| 9,649,967 B2 | | 5/2017 | Weldy |
| 2002/0113382 A1 | | 8/2002 | Dosdall |
| 2003/0231131 A1 | * | 12/2003 | Dinnig .................. B60R 25/209 |
| | | | 341/176 |
| 2008/0296929 A1 | * | 12/2008 | Suzuki ...................... B60J 5/12 |
| | | | 296/146.9 |
| 2009/0184480 A1 | | 7/2009 | Larsson et al. |
| 2013/0144494 A1 | * | 6/2013 | Mayr .................. B60G 17/017 |
| | | | 701/48 |

* cited by examiner

PET MODE DOOR AND SUSPENSION CONTROL SYSTEM AND METHOD

BACKGROUND

Many vehicle owners have a need or desire to transport their pets in their vehicles. Oftentimes, the vehicle owner will open a door for the pet (e.g., a dog) and allow the pet to enter or exit the vehicle otherwise unassisted. In other words, the pet will jump into or out of the vehicle after the vehicle owner opens the door for the pet. The height of the vehicle can present an obstacle for the pet, particularly if the pet is smaller or less mobile/agile (e.g., due to age). This problem is exacerbated on larger vehicles and/or on vehicles with doors where the lift-over height is significant. For example, the lift-over height on a vehicle's rear tailgate can be significantly challenging for pets (e.g., on an SUV or similar higher riding vehicle).

BRIEF DESCRIPTION

According to one aspect, a pet mode door and suspension control system for a vehicle is provided. The system includes a memory storing instructions that, when executed by a processor, cause the processor to determine whether a door control action has occurred with respect to a door on the vehicle and, when determined that the door control action has occurred, to determine whether a pet mode control action is needed. When determined that the pet mode control action is needed, the system includes sending a suspension control command to a suspension control system for raising and/or lowering at least one side of the vehicle and sending a door control command to a power control unit for opening or closing the door in accord with the door control action.

According to another aspect, a computer-implemented pet mode door and suspension control method for a vehicle includes determining whether a door control action has occurred with respect to a door on the vehicle. When determined that the door control action has occurred, the method further includes determining whether a pet mode control action is needed. When determined that the pet mode control action is needed, the method includes sending a suspension control command to suspension control system for raising and/or lowering at least one side of the vehicle and sending a door control command to a power control unit for opening or closing the door in accord with the door control action.

According to a further aspect, a non-transitory computer readable storage medium storing instructions that, when executed by a computer, which includes at least a processor, causes the computer to perform a method that includes determining whether a door control action has occurred with respect to a door on the vehicle and, when determined that the door control action has occurred, determining whether a pet mode control action is needed. When determined that the pet mode control action is needed, the method includes sending a suspension control command to suspension control system for raising and/or lowering at least one side of the vehicle and sending a door control command to a power control unit for opening or closing the door in accord with the door control action.

DETAILED DESCRIPTION

Figure 1:
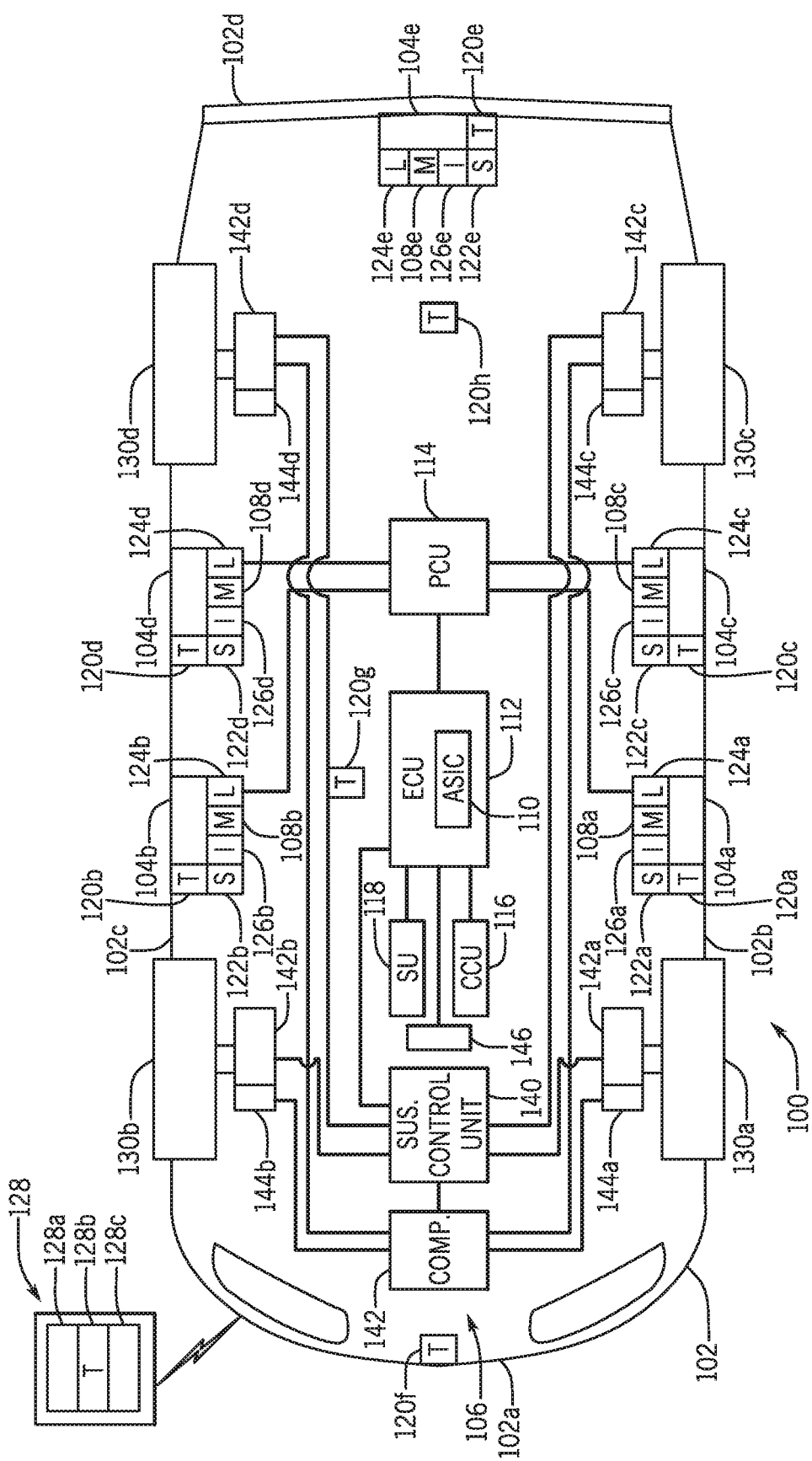
FIG. 1 illustrates a schematic view of an operating environment of a pet mode door and suspension control system for a vehicle according to an exemplary embodiment.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Media Oriented System Transport (MOST), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device" as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection," as used herein can include a connection by which entities are "operably connected", is one in which signals, physical communications, and/or logical communications can be sent and/or received. An operable connection can include a physical interface, a data interface and/or an electrical interface.

An "output device" as used herein can include devices that can derive from vehicle components, systems, subsystems, and electronic devices. The term "output devices" includes, but is not limited to: display devices, and other devices for outputting information and functions.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X can be given as a percentage between 0% and 100%. In other cases, the value or level of X could be a value in the range between 1 and 10. In still other cases, the value or level of X can not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 shows a schematic view of an exemplary operating environment of a pet mode tailgate and suspension control system 100 for a vehicle 102. The system 100 provides operation of at least one vehicle door 104a-104e and coordinated operation of a suspension control system 106 based on a pet mode state (e.g., first pet mode state is "on" or active and second pet mode state is "off" or inactive). The components of the system 100, as well as the components of other systems, hardware architectures and software architectures discussed herein, can be combined, omitted or organized into different architecture for various embodiments. However, the exemplary embodiments discussed herein focus on the environment as illustrated in FIG. 1, with corresponding system components, and related methods.

In an exemplary embodiment, operation of at least one vehicle door 104a-104e can include automated powered opening and/or closing of the one or more vehicle doors 104a-104e of the vehicle 102 by one or more motors 108a-108e associated with the vehicle doors 104a-104e and coordinated operation of the suspension control system 106 can include automated powered raising and/or lowering of various sides 102a-102d of the vehicle 102 in coordination with the operation of the at least one vehicle door 104a-104e, which can include automated opening and/or closing of the at least one vehicle door 104a-104e. In this exemplary embodiment, operation of the at least one vehicle door 104a-104e and coordinated operation of the suspension control system 106 can be based on the pet mode state as will be described below in more detail.

More specifically, and also as described in more detail below, the automated powered opening and/or closing of one or more of the vehicle doors 104a-104e and the coordinated operation of the suspension control system 106 can be based on one or more execution commands sent by a pet mode application-specific integrated circuit 110 (hereinafter referred to as pet mode ASIC) included as part of an electronic control unit 112 (ECU) of the vehicle 102. The commands can be based on a determination that a door control action (DCA) has occurred with respect to a selected one (i.e., a door) of the at least one vehicle door 104a-104e and a determination that a pet mode control action (PMCA) is needed.

In an exemplary embodiment, the ECU 112 operably controls the vehicle 102 and its components that can include, but are not limited to the components shown in FIG. 1. The ECU 112 can include a microprocessor, one or more application-specific integrated circuit(s) (ASICs), or other similar devices. The ECU 112 can also include internal processing memory, an interface circuit, and bus lines for transferring data, sending commands, and communicating with the systems and components of the vehicle 102. Generally, the ECU 112 includes a processor and memory (not shown). The ECU 112 also includes a separate communications device (not shown) for sending data internally in the vehicle 102. In one or more embodiments, the pet mode ASIC 110 can be included in the form of an integrated circuit that is embedded as part of the ECU 112. In some embodiments, the pet mode ASIC 110 can include its own microprocessor and memory (both not shown) and alternatively the pet mode ASIC 110 could be independent of the ECU 112. In one embodiment, the ECU 112 can operably communicate with a head unit (not shown) of the vehicle 102. The ECU 112 and/or the head unit can send one or command signals to a plurality of vehicle systems (e.g., infotainment system, lighting system, etc.), that can communicate with the pet mode ASIC 110 to provide one or more notifications to individuals associated with the vehicle 102 (e.g., the driver, passenger(s), someone loading or unloading the vehicle, etc.).

In one or more embodiments, in addition to the aforementioned components of the system 100, the vehicle 102 can include a power control unit 114, a communication control unit 116, a storage unit 118, one or more transceivers 120a-120h, one or more motion sensors 122a-122e, door locks 124a-124e, and door input buttons 126a-126e. Optionally, the power control unit 114, the communication control unit 116 and/or the storage unit 118 can be integrated with and/or be a part of the ECU 112. As discussed below, the communication control unit 116 of the vehicle 102 can utilize the one or more transceivers 118a-118h to send and receive communication signals (e.g., low frequency (LF) polling/polling response signals) in communication with one or more portable devices 126.

In one embodiment, the storage unit 114 of the vehicle 102 can include various memories such as, for example L1, L2, or L3 cache or system memory. As such, the memory can include static random access memory (SRAM), dynamic RAM (DRAM), flash memory, read only memory (ROM), or other similar memory devices. The storage unit 114 can be utilized to store one or more operating systems, applications, associated operating system data, application data, vehicle system and subsystem user interface data, and the like that can be executed by the ECU 112.

In an exemplary embodiment, as described in more detail below, one or more of the vehicle doors 104a-104e can include, but is not limited to, a left side front door 104a, a right side front door 104b, a left side rear door 104c, a right side rear door 104d, and a tailgate door 104e. One or more of the vehicle doors 104a-104e can include the associated motor 106a-106e that can operate the respective vehicle doors 104a-104e based on signals sent and received from/by the pet mode ASIC 110. In one or more embodiments, one or more of the vehicle doors 104a-104e can include an automatically lifting door (e.g. lift gate door), a swinging door, or sliding door, etc. (specific door configurations not shown) that can be manually opened or closed and/or opened or closed based on the operation of one or more of the associated motors 108a-108e that are supplied power by the power control unit 114 on the vehicle 102.

Additionally, the associated motor 108-108e can operate the lock 124a-124e of each of the respective vehicle doors 104a-104e based on signals sent and received from/by the pet mode ASIC 110. The lock(s) 124-124e can function to be locked or unlocked by the respective motor 108a-108e based on the operation of one or more of the associated motors 108a-108e that are supplied power by the power control unit 114 of the vehicle 102. As discussed below, the powered locking or unlocking of one or more of the door locks 124a-124e and/or the opening or closing of the one or more vehicle doors 104a-104e can be determined based on processing completed by the pet mode ASIC 110.

In one or more embodiments, the one or more doors 104a-104e can include the respective door input buttons 126a-126e. As described below in more detail below, the door input buttons 126a-1246e can communicate with various components of the vehicle 102 including the ECU 112 to partially control operation of one or more of the vehicle doors 104a-104e. For example, the door input buttons 126a-126e can be inputted or used by an individual to effect a door control action (e.g., to indicate the individual's intention to operate one of the doors 104a-104e, such as to automatically opening or closing said one of the doors 104a-104e). For each door 104a-104e, the corresponding door input buttons 126a-126e can be provided on the exterior of the vehicle 102 and/or inside the vehicle 102.

In one or more embodiments, one or more of the vehicle doors 104a-104e can also include corresponding motion sensors 122a-122e. In one embodiment, these can be disposed on or near one or more of the vehicle doors 104a-104e. For example, the motion sensors 122a-122e can be disposed in one or more areas that can include, but are not limited to, areas underneath the respective vehicle doors 104a-104e, above the respective vehicle doors 104a-104e, a floor board (not shown) of the vehicle 102 near the respective vehicle doors 104a-104e, a ceiling (not shown) of the vehicle 102 near the respective vehicle doors 104a-104e, and the like. In one example, the motion sensors 122a-122e can be used to signify a door control action (e.g., to indicate an individual's intention to operate one of the doors 104a-104e, such as to automatically open or close said one of the doors 104a-104e).

The one or more motion sensors 122a-122e can include, but are not limited to microwave motion sensors, infrared motion sensors, radar based motion sensors, and the like, and can be utilized to sense the movement of individual(s) and/or object(s) sensed within a predetermined detection range of the one or more motion sensors 122a-122e. In alternate embodiments, the one or more motion sensors 122a-122e can include additional sensors (not shown) that can be used to detect the movement of the individual(s) and/or object(s), such as touch sensors, proximity sensors, field disturbance sensors, and the like. Additionally, the one or more motion sensors 122a-122e can be utilized to sense a moving pattern of the individual(s) and/or object(s) that can include a direction of movement of the individual(s) and/or object(s), and when motion associated with the individual(s) and/or object(s) is no longer sensed within the predetermined detection range of the one or more motion sensors 122a-122e.

In an exemplary embodiment, the communication control unit 116 of the vehicle 102 is operably connected to the one or more transceivers 120-120h in addition to the ECU 112, the power control unit 114, and the pet mode ASIC 110. The communication control unit 116 can be configured to control operation of the one or more transceivers 120a-120h to send one or more communication signals (e.g. LF signals, RF signals, etc.) to the one or more portable devices 128. Additionally, the communication control unit 116 can be configured to control operation of the one or more transceivers 120a-120h to receive one or more communication response signals from the one or more portable devices 128.

In an exemplary embodiment, the one or more transceivers 120a-120h can be capable of providing wireless computer communications utilizing various protocols to be used to send/receive electronic signals internally to components and systems within the vehicle 102 and to external devices including the one or more portable devices 128. The one or more transceivers 120a-120h can include respective transmitter antennas (not shown) and receiver antennas (not shown) that can be separate components or can be configured as a single component. The one or more transceivers 120a-120h can be included at one or more areas of the vehicle 102 that can be utilized to determine a location of the portable device(s) 128 and/or a movement of the portable device(s) 128 with respect to the vehicle 102 and/or specifically with respect to one or more of the vehicle doors 104a-104e. For example, as shown in FIG. 1, transceivers 120a-120h can be provided within a vicinity of each of the vehicle doors 104a-104e, adjacent or near front side 102a of the vehicle 102, at a middle portion of the vehicle 102 disposed approximately between front and rear wheels 130a-130d and/or between the front and rear doors 120a-120d, and adjacent or near rear side 102d of the vehicle 102 to send and receive signals from various areas around the vehicle 102.

In an exemplary embodiment, the one or more portable devices 128 can include, but are not limited to, one or more of electronic key fobs, smart keys, mobile electronic devices, remote controls, and the like. Several functions of the vehicle 102 can be controlled by user input that is provided on the one or more portable devices 126 that influence and/or command the ECU 112 and/or pet mode ASIC 110 to control the components of the system 100 based on wireless computer communication between the portable device(s) 128 and the transceiver(s) 120a-120h of the vehicle 102.

In one embodiment, the one or more portable devices 128 can include a microprocessor 128a that is utilized to operably control components of the portable device(s) 126. The microprocessor 128a can include memory, an interface circuit, and bus lines, for transferring data, sending commands, communicating with the various components and controlling an overall operation of the portable device(s) 128. In one embodiment, the microprocessor 128a can store a specific identification code that specifically corresponds to the portable device(s) 128 to be used as an identification mechanism by the vehicle 102. The one or more portable devices 128 can also include a transceiver 128b that can send and receive electronic signals to and from the vehicle 102. In particular, the transceiver 128b can send to and receive signals from the one or more transceivers 120a-120h.

In one or more embodiments, the one or more portable devices 128 can additionally include input buttons 128c that can include, but are not limited to, door lock buttons, door unlock buttons, door open/close start/stop button, etc. (individual buttons not shown). As will be described below, in one embodiment, input of the door open/close start/stop button that can be utilized to start or stop the powered opening or closing of one or more of the vehicle doors 104a-104e. In one embodiment, input via the input buttons 128c of the one or more portable devices 128 and communicated to the communication control unit 116 signifies a door control action. For example, an individual can use the input buttons 128c to initiate opening or closing of one of the vehicle doors 104a-104e.

In one or more embodiments, in addition to the aforementioned components of the system 100, the vehicle 102 can includes the suspension control system 106, which can include a suspension control unit 140, a suspension compressor 142 and suspension assemblies 142a-142d associated with each of the wheels 130a-130d. Each of the suspension assemblies 142a-142d can include an air spring 144a-144d fluidly connected to the compressor 142 for receiving compressed air therefrom. The suspension control unit 140 can control the compressor 142 and each of the suspension assemblies 142a-142d so as to be capable of individually adding air or removing air from each air spring 144a-144d of the suspension assembly 142a-142d at each wheel 130a-130d. Such control by the suspension control unit 140 can include controlling air to the air springs 144a-144d during driving of the vehicle 102 to provide desired suspension characteristics for the vehicle 102. Optionally, the suspension control unit 140 can be can be integrated with and/or be a part of the ECU 112.

Additionally, any two adjacent air springs 144a-144d can be simultaneously controlled by the suspension control unit 140 to raise or lower a particular side (i.e., one of the sides 102a-102d) of the vehicle 102. For example, the air springs 144c, 144d disposed at the rear wheels 130c, 130d along the rear side 102d can be simultaneously operated to lower the rear side 102d of the vehicle 102. At the same time, the air springs 144a, 144b disposed at the front wheels 130a, 130b along the front side 102a can be simultaneously operated to raise the front side 102a of the vehicle 102. Such operation can reduce the lift-over height associated with the rear door 104e for easier ingress or egress for a pet while the vehicle is stopped (i.e., not driving). In alternative embodiments, an alternate suspension control system, including alternate suspension assemblies, could be used in substitution for the suspension control system 106 and the air springs 144a-144d. For example, a hydraulic suspension control system could be used that operates hydraulic springs at each of the wheels 130a-130d via some sort of hydraulic fluid.

Also in one or more embodiments, the pet mode or pet mode state can be toggled between or selected as one of the pet mode "on" state (i.e., a first pet mode state) and a pet mode "off" state (i.e., a second pet mode state). In the pet mode "on" state, the pet mode ASIC will determine if a pet mode control action is needed if certain conditions are met (e.g., if a door control action has occurred with respect to one of the doors 104a-104d on the vehicle 102). To toggle or select the pet mode state, a pet mode actuator 146 can be provided for the vehicle 102. In one embodiment, the pet mode actuator 146 can be or include a control switch or button disposed in the vehicle 102. For example, the actuator 146 can be a rotary knob movable from a pet mode "on" position to a pet mode "off" position. Alternatively, the actuator 146 can be a button that, when depressed, toggle the pet mode state between the "on" and "off" states. An indicator can be provided in the vehicle 102 to indicate whether the pet mode state is "on" or "off."

In the same or another embodiment, the pet mode actuator 146 can be provided as an on-screen option on a user interface screen in the vehicle 102. For example, the pet mode state can be toggled or selected as a menu option on a display screen provided in the vehicle. Also in the same or another embodiment, the pet mode state can be toggled or selected using the portable device 128. For example, the input buttons 128c on the portable device 128 can be used to toggle or select the pet mode state remotely relative to the vehicle 102.

Figure 2:
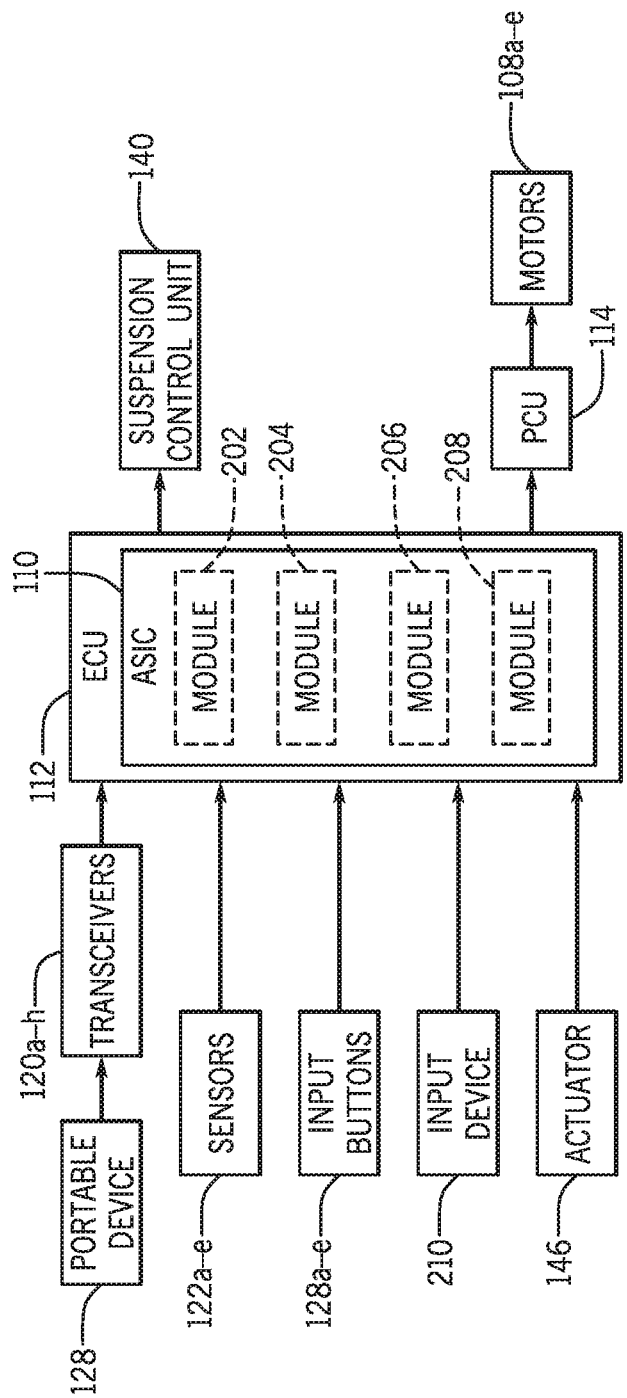
FIG. 2 illustrates a schematic view of an exemplary operating environment of a pet mode application-specific integrated circuit (ASIC) according to an exemplary embodiment.

With additional reference to FIG. 2, the pet mode ASIC 110 will now be discussed in more detail. FIG. 2 illustrates a schematic view of an exemplary operating environment 200 of the pet mode ASIC 110 according to an exemplary embodiment. As shown in FIG. 2, in an illustrative embodiment, the pet mode ASIC can execute and store one or more modules 202-208 that can include a door control action module 202, a pet mode control action module 204, a suspension control command module 206 and a door control command module 208.

In operation, the door control module 202 determine whether a door control action has occurred with respect to one of the doors 104a-104e on the vehicle 102. A door control action could be an indication of an intent to open or close one of the doors 104a-104e, such as an intent to automatically open or close one of the doors 104a-104e via a corresponding one of the motors 108a-108e. In one embodiment, such an intent could be communicated by the portable device 128 through one or more of the transceivers 120a-120h. Alternatively, this could be communicated by one of the doors 104a-104e, and particularly one or more of the sensors 122a-122e or input buttons 128a-128e associated with the doors 104a-104e. For example, an operator could depress one of the input buttons 128e to signify an intention to open or close the rear door 104e. In an alternate example, an operator could perform a certain gesture (e.g., a predetermined open door gesture or close door gesture) in the field of vision of the sensor 122e to signify an intention to open or close the rear door 104e. Such a gesture could include the user grasping a handle or other actuator associated with the door. In a further embodiment, the intention to open or close one of the doors 104a-104e could be input and communicated to the pet mode ASIC 110 through some other input device 210, such as a dashboard control or button.

The pet mode control action module 204 can determine whether a pet mode control action is needed. This can include determining whether the pet mode state is "on". When determined that the pet mode state is "on," this can also optionally include determining whether the vehicle 102 is already in or moving toward a desired position for a pet to enter or exit the vehicle 102. For example, if an operator were to initiate a door control action to open the rear door 104d after a just prior door control action was initiated to open the rear door 104d, the pet mode control action module 204 could determine that no pet mode control action is needed since a prior pet mode control action was already determined as needed and acted upon.

The suspension control command module 206 can send a suspension control command to the suspension control system 106, and particularly to the suspension control unit 140, when determined by the pet mode control action module 204 that the pet mode control action is needed. As discussed above, this command can cause the suspension control system 106 to lower one of the sides 102a-102e of the vehicle 102 corresponding to a side on which the door 104a-104e is disposed. In addition or in the alternative, this command can also cause the suspension control system 106 to raise an opposite one of the sides 102a-102e of the vehicle 102 corresponding to an opposite side from that on which the door 104a-104e is disposed.

Similarly, the door control command module 208 can send a door control command to a power control unit 114 for opening or closing the corresponding door (i.e., the door 104a-104e for which the door control action was determined by the module 202) in accord with the door control action. For example, this command could cause the corresponding door to open via the corresponding motor 108a-108e and, if needed, to be unlocked by the corresponding motor 108a-108e prior to opening. Alternatively, this command could cause the corresponding door to close via the corresponding motor 108a-108e. By way of a specific example, if the door control action was to open the rear door 104e as determined by the door control action module 202, the door control command module 208 could instruct the power control unit 114 to power open the rear door 104e and, if needed, unlock the rear door 104e.

Exemplary Methods Utilized by the Pet Mode ASIC

Figure 3:
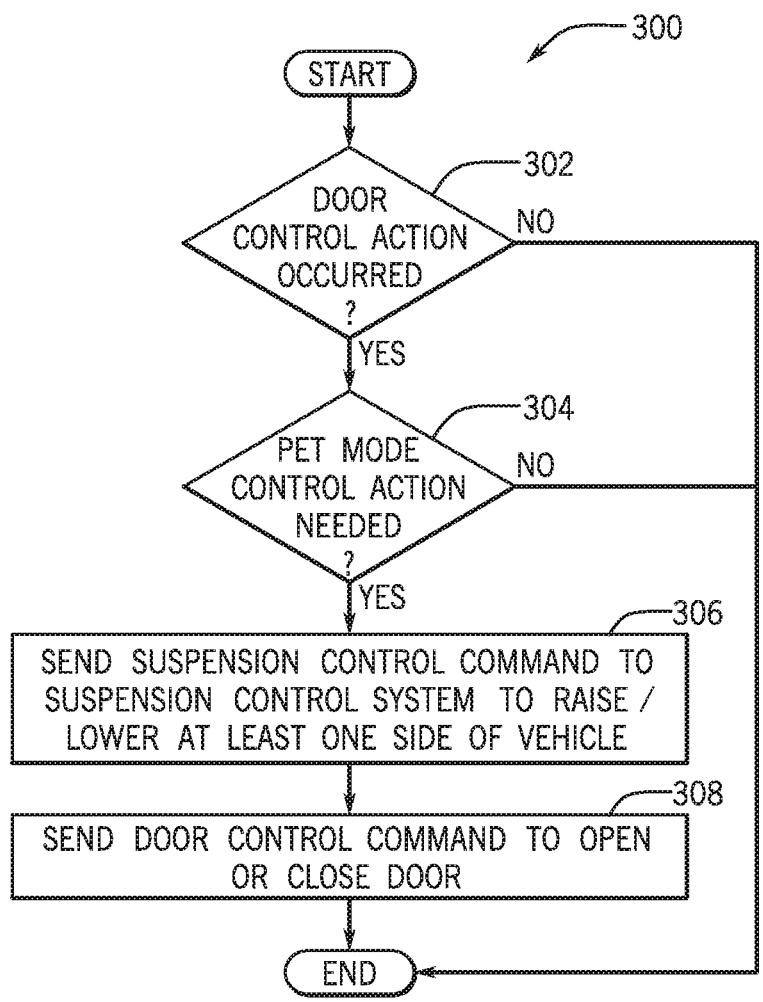
FIG. 3 is a process flow diagram of a pet mode door and suspension control method for a vehicle according to an exemplary embodiment.

FIG. 3 is a process flow diagram of a pet mode door and suspension control method for a vehicle according to an exemplary embodiment. FIG. 3 will be described with reference to the components of FIG. 1 and FIG. 2 though it is to be appreciated that the method of FIG. 3 can be used with other systems and/or components. With reference to FIG. 3, the method includes, at 302, determining whether a door control action has occurred with respect to a door on the vehicle at 302. In particular, the pet mode ASIC 110, and particularly the door control action module 202 thereof, determines whether a door control action has occurred with respect to one of the doors 130a-130e on the vehicle 102. A door control action can include an action taken by someone associated with the vehicle 102 (e.g., a driver, a passenger, an owner, someone loading or unloading the vehicle, etc.). A door control action can correspond with an intention by the user to control on of the doors 201a-201e on the vehicle 012. For example, the door control action can correspond with an intention by the user to automatically open one of the doors 104a-104e. Alternatively, the door control action can correspond with an intention by the user to automatically close one of the doors 104a-104e on the vehicle 102.

By way of example, the door control action can be determined to have occurred at 302 when the portable device 128 sends a door open or door close command signal to the vehicle 102. This can be communicated from the portable device 128 via the transceiver 128b thereof through one of the transceivers 120a-120h on the vehicle 102, which in turn communicate the door open or door closed command signal to the ECU 112 in the vehicle 102, and particularly to the pet mode ASIC 110. Alternatively, a door control action can be communicated to the ECU 112, and particularly to the pet mode ASIC 110, through one of the sensors 122a-122e, through the door input buttons 126a-126e, or through the input device 210 signifying an intention by the user to open or close one of the doors 104a-104e.

Next, at 304, a determination is made by the pet mode ASIC 110, and particularly by the pet mode control action module 204, as to whether a pet mode control action is needed. This can include, for example, determining whether the pet mode status is "on." For example, the actuator 146 can communicate with the ECU 112 to indicate that the pet mode status is "on." Alternatively, the memory within the ECU 112 can store the pet mode status and can simply be referenced to determine if the pet mode status is "on" by the pet mode control action module 204 of the pet mode ASIC 110. Also, the determination as to whether the pet mode control action is needed by the module 204 can include determining if a previous pet mode control action has already been taken. For example, if the suspension control system 106 has already lowered one of the sides 102a-102d on the vehicle, then it can be determined by the pet mode ASIC 110 that no pet mode control action is needed.

When determined that the pet mode control action is needed, however, the pet mode ASIC 110, and particularly the suspension control command module 206 thereof, can send a suspension control command to the suspension control system 106 to raise and/or lower at least one side of the vehicle. Also, in coordination with sending of the suspension control command, the pet mode ASIC 110, and particularly the door control command module 208, can send a door control command to open or close the associated door. For example, the pet mode ASIC 110 can send a suspension control command that instructs the suspension control system 106 via the suspension control unit 140 to lower one of the sides 102a-102d of the vehicle 102 corresponding to the door 104a-104d that is to be opened. Additionally, the suspension control command can instruct the suspension control system 106 via the suspension control unit 140 to raise an opposite one of the sides 102a-102d of the vehicle 102 that is opposite the door that is to be opened. In coordination with the suspension control command, the pet mode ASIC 110 can send the door control command to open or close the appropriate door 104a-104e.

Figure 4:
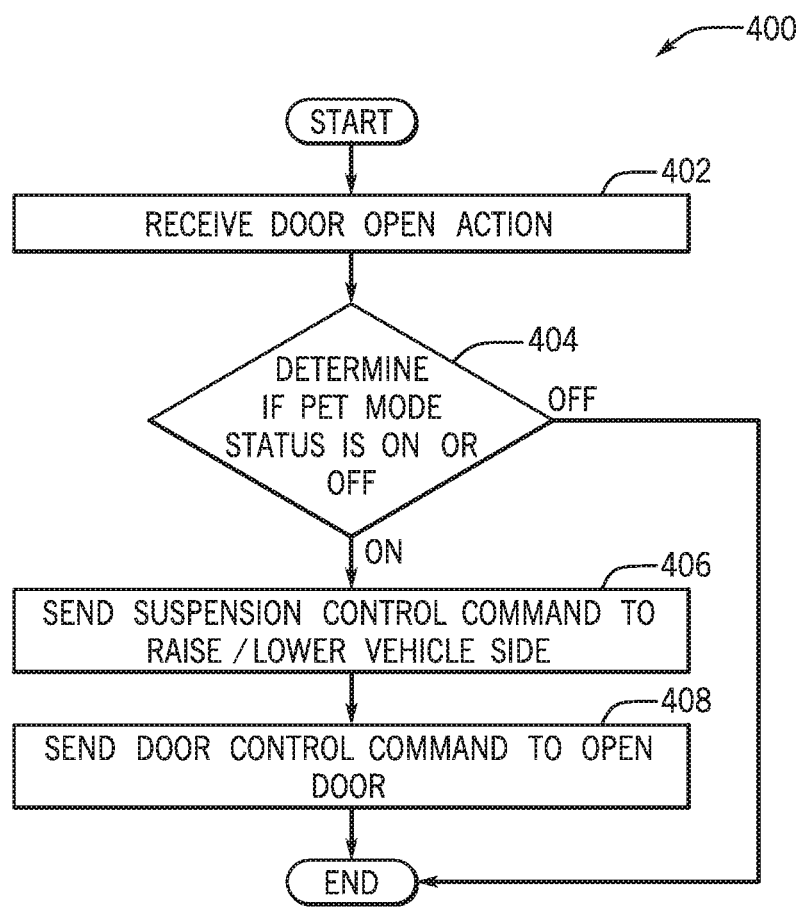
FIG. 4 is a process flow diagram of a pet mode door and suspension control method for opening a door on a vehicle according to an exemplary embodiment.

With additional reference to FIG. 4, a particular example will be further described. FIG. 4 illustrates another exemplary method 400 wherein a door control action, and particularly a door open control action, is received at 402. As already mentioned, determining whether the door control action has occurred can include receiving a door open or door closed signal wirelessly from the portable device 128. In addition or in the alternative, determining whether the door control action has occurred can include at least one of: one of the sensors 122a-122e detecting an intention to open or close one of the doors 104a-104e or one of the input buttons 126a-126e associated with the door sending a door open or door closed signal indicating intention to open or close the door.

Next at 404, a determination can be made by the pet mode ASIC 110 as to whether the pet mode status is "on" or "off." If off, the method ends. If on, the pet mode ASIC 110 sends the suspension control command to raise/lower one of the vehicle sides 102a-102d of the vehicle 102 having the door that is to be opened (i.e., one of the doors 104a-104e) at 406 and sends the door control command to open the same door (i.e., the same one of the doors 104a-104e) at 408. Sending of the suspension control command at 406 can include lowering a first side of the vehicle 102 on which the door is disposed. For example, if the door to be opened is the rear door 104e, then the suspension control command can include sending a command to the suspension control unit 140 that lowers the rear side 102d of the vehicle 102 to decrease a lift-over height associated with the rear door 104e to enable a pet to more easily enter or exit the vehicle 102.

Such lowering of the rear side 102d can occur as already described by the suspension control unit 140 controlling the suspension assemblies 140c and 140d, and particularly the air springs 144c and 144d to lower the rear side 102d of the vehicle 102. Optionally, sending the suspension control command can also include raising a second side of the vehicle 102 that is opposite the first side. In the same example, if the door to be opened is the rear door 104e (e.g., a tailgate door), then the suspension control command can include a command to the suspension control unit 140 that raises the front side 102a of the vehicle 102 that is opposite the rear side 102d. In a similar manner to lowering of the rear side 102d, the suspension control unit 140 can control the suspension assemblies 142a, 142b, and particularly the air springs 144a and 144b thereof, to raise the front side 102a of the vehicle. The combination of lowering one side of the vehicle and raising an opposite of the vehicle more easily facilitates ingress and egress of a pet into a particular door on the vehicle.

Figure 6:
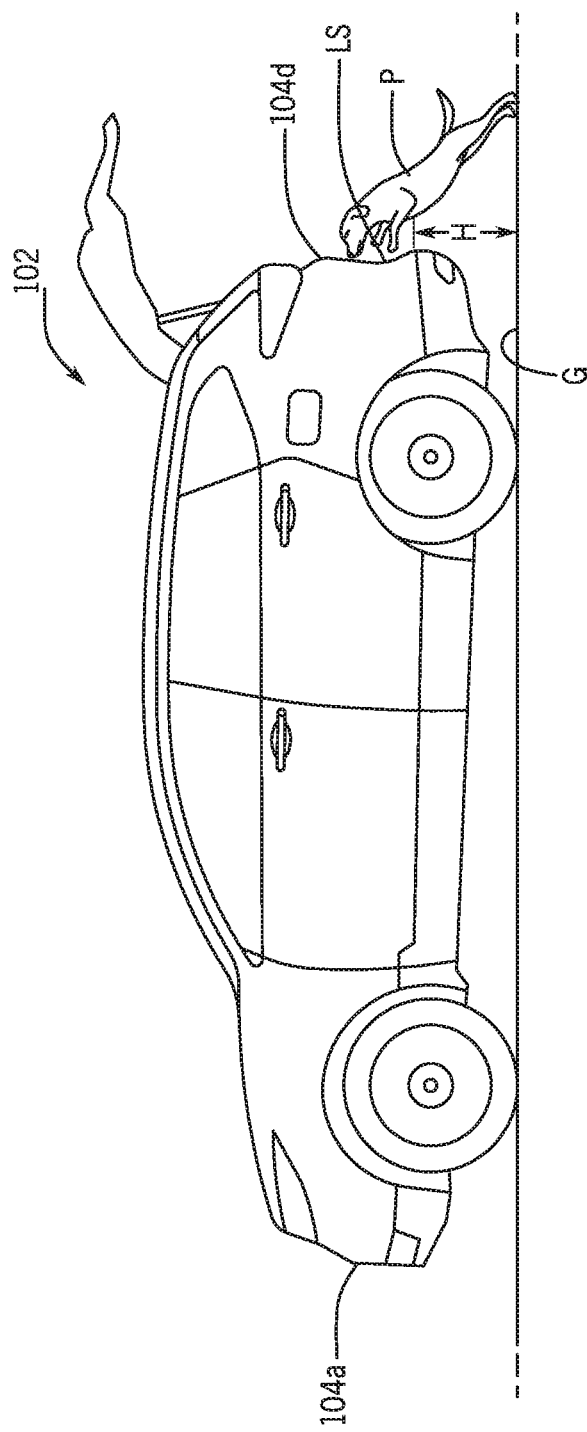
FIG. 6 is a schematic illustration of a vehicle operating according to the system of FIG. 1, the ASIC of FIG. 2 and/or one of the methods of FIGS. 3-5.

This is schematically illustrated in FIG. 6 wherein the vehicle 102 has its rear side 102d lowered and its front side 102a raised with the rear door 104e opened. As shown, this reduces a lift-over height H between the ground G and the lower side LS of the rear door opening associated with the rear door 104d. This enables a pet P more easily enter the vehicle 102 and would likewise enable the pet P to more easily exit the vehicle 102.

It is also contemplated that lowering one side and raising an opposite side of the vehicle 102 can occur with respect to at least the right and left sides 102b and 102c of the vehicle. For example, if the door 104a is commanded to be opened in the method 400, the side 102b can be lowered and the side 102b opposite the door side to be opened can be raised presuming the pet mode status is on to more easily enable the pet to enter the door 104a on the vehicle 102.

Figure 5:
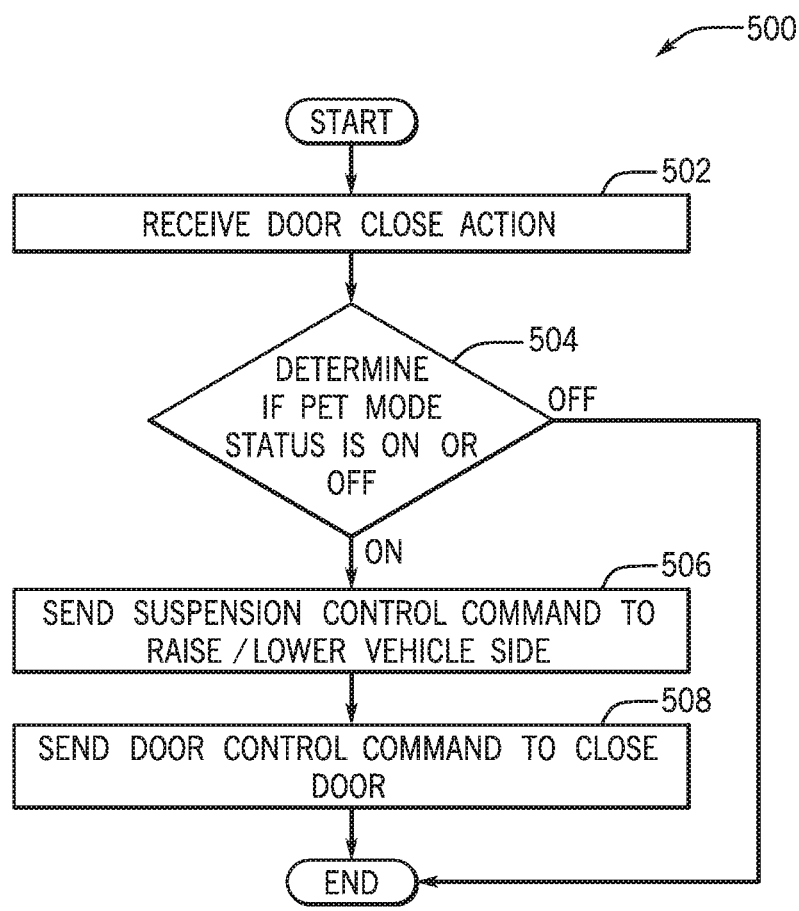
FIG. 5 is a process flow diagram of a pet mode door and suspension control method for closing a door on a vehicle according to an exemplary embodiment.

Now, with reference to FIG. 5, a further exemplary method 500 is illustrated. In the method 500, a door control action, and particularly a door control close action is received at 502. This can be via the portable device 128 via the sensors 122a-122e, the door input buttons 128a-128e, or the input device 210 in a similar manner as to receipt of the door open action. In particular, any of the foregoing can be used to signify an intention by a user to closer one of the doors 104a-104e on the vehicle 102.

Next at 504, a determination can be made as to whether a pet mode control action is needed. This can include determining if the pet mode status is on or off. Alternatively, this can include determining whether the suspension control system 106 was altered previously due to the pet mode status having been on and a door on the vehicle 102 opened. For example, if one of the sides 102a-102d on the vehicle 102 was previously lowered or raised, a determination can be made at 504 that a pet mode control action is needed to return the side or sides of the vehicle 102 to the pre-raised or lowered position. When determined that a pet mode control action is needed at 504, a suspension control command can be set to the suspension control system 106, and particularly through the suspension control unit 140 of the system 106 to effect raising or lowering of the vehicle side.

For example, if the rear door 104e was previously opened and the rear side 102de lowered in the method 400 of FIG. 4, then at 506, the suspension control command can instruct the suspension control unit 140 to raise the rear side 102d back to its original raised position. Also, if an opposite side was raised, such as the front side 102a, the suspension control command can instruct the suspension control unit 140 to lower the side, such as the front side 102a, back to its original non-raised position. In coordination with the suspension control command sent at 406, a door control command can be sent at 508 to close the opened door in accord with the door closed action received at 502.

It will be appreciated that various of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A pet mode door and suspension control system for a vehicle, comprising:
    a memory storing instructions that, when executed by a processor, cause the processor to:
    determine whether a door control action has occurred with respect to a door on the vehicle; and
    when determined that said door control action has occurred: determine whether a pet mode control action is needed,
        wherein, in determining whether said pet mode control action is needed, a determination is made as to whether a pet mode state is on or off, and
    when determined that said pet mode state is on and further determined that a suspension control command associated the pet mode state being on has not already been sent to a suspension control system, send the suspension control command to the suspension control system for raising and/or lowering at least one side of the vehicle, and
    send a door control command to a power control unit for opening or closing the door in accord with the door control action.

2. The system of claim 1 wherein, in determining whether said door control action has occurred, said door control action has occurred when a door open or door closed signal is received wirelessly from a portable device.

3. The system of claim 1 wherein, in determining whether said door control action has occurred, said door control action has occurred when a sensor associated with said door detects an intention to open or close said door.

4. The system of claim 3 wherein said sensor detects the intention to open or close said door by at least one of: detecting an open door gesture or detecting a grasping of a handle or other actuator associated with said door.

5. The system of claim 1 wherein, in determining whether said door control action has occurred, said door control action has occurred when at least one input button associated with said door indicates an intention to open or close said door.

6. The system of claim 1 wherein the vehicle includes a pet mode actuator disposed therein that enables the pet mode state to be selectively changed between on and off.

7. The system of claim 1 wherein said power control unit commands a motor to open or close the door in accord with the door control action when said door control command is received.

8. The system of claim 1 wherein said at least one side includes a first side on which said door is disposed, and wherein the suspension control system lowers said first side of the vehicle when said suspension control command is received.

9. The system of claim 8 wherein said at least one side includes a second side that is opposite said first side, and wherein the suspension control system raises said second side of the vehicle when said suspension control command is received.

10. The system of claim 9 wherein said door is a tailgate and said first side is a rear side of the vehicle.

11. The system of claim 8 wherein said suspension control system raises said first side back to a previous height when said door is closed after said suspension control system lowered said first side when said suspension control command was received.

12. The system of claim 1 wherein said at least one side includes a first side on which said door is disposed and a second side that is opposite said first side, and wherein the suspension control system lowers said second side of the vehicle when said suspension control command is received.

13. A computer-implemented pet mode door and suspension control method for a vehicle, comprising:
   determining whether a door control action has occurred with respect to a door on the vehicle; and
   when determined that said door control action has occurred:
   determining whether a pet mode control action is needed,
      wherein determining whether said pet mode control action is needed includes determining whether a pet mode state is on or off, and determining whether a previous pet mode control action has already occurred, and
   when determined that said pet mode state is on and that a previous pet mode control action has not already occurred, sending a suspension control command to a suspension control system for raising and/or lowering at least one side of the vehicle, and
   sending a door control command to a power control unit for opening or closing the door in accord with said door control action.

14. The method of claim 13 wherein determining whether said door control action has occurred includes receiving a door open or door closed signal wirelessly from a portable device.

15. The method of claim 13 wherein determining whether said door control action has occurred includes at least one of: a sensor detecting an intention to open or close the door or an input button associated with the door sending a door open or door closed signal indicating an intention to open or close the door.

16. The method of claim 13 wherein sending the suspension control command includes lowering a first side of the vehicle on which said door is disposed.

17. The method of claim 16 wherein sending the suspension control command also includes raising a second side of the vehicle that is opposite the first side.

18. A non-transitory computer readable storage medium storing instructions that, when executed by a computer, which includes at least a processor, causes the computer to perform a method, the method comprising:
   determining whether a door control action has occurred with respect to a door on a vehicle; and
   when determined that said door control action has occurred: determining whether a pet mode control action is needed,
      wherein, in determining whether said pet mode control action is needed, a determination is made as to whether a previous pet mode control action has already occurred, and
   when determined that a previous pet mode control action has not already occurred, sending a suspension control command to a suspension control system for raising and/or lowering at least one side of the vehicle, and
   sending a door control command to a power control unit for opening or closing the door in accord with the door control action.

19. The non-transitory computer readable storage medium of claim 18, wherein said at least one side includes a first side on which said door is disposed, and wherein the suspension control system lowers said first side of the vehicle when said suspension control command is received.

20. The non-transitory computer readable storage medium of claim 19, wherein said at least one side includes a second side that is opposite said first side, and wherein the suspension control system raises said second side of the vehicle when said suspension control command is received.

* * * * *